PRIOR ART

SINGLE SIDE BAND HALL-TYPE MODULATOR AND DEMODULATOR
Filed Dec. 20, 1961 3 Sheets-Sheet 3
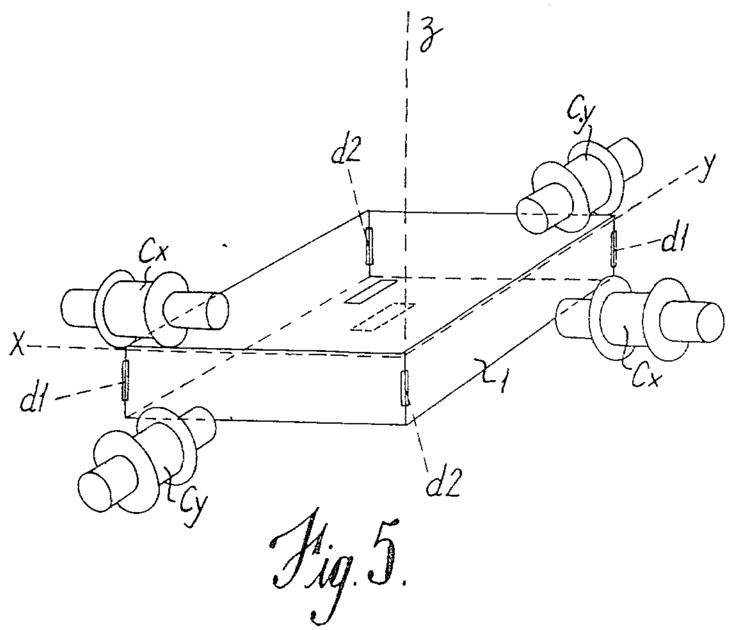
Fig. 5.
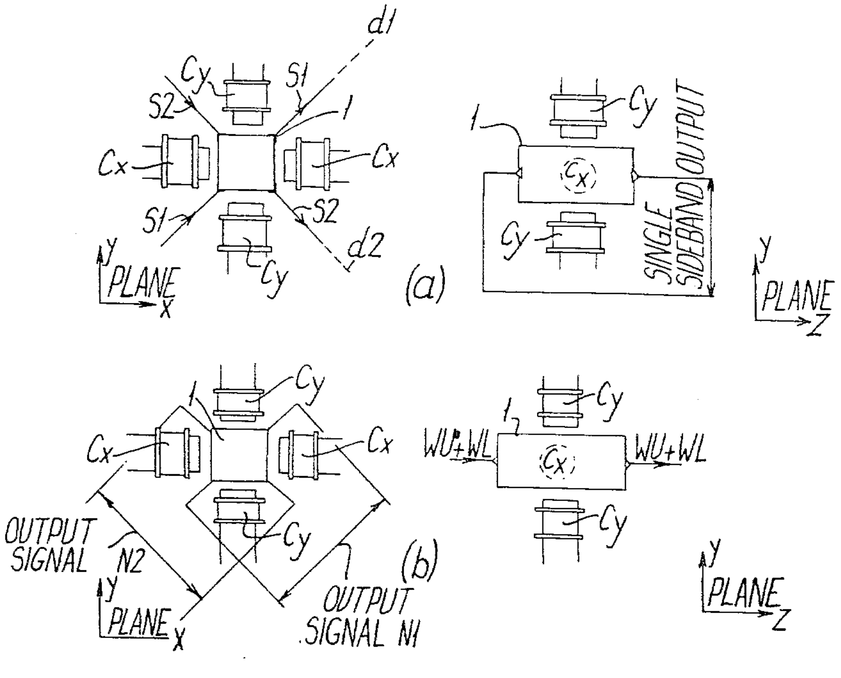
(a) (b)

United States Patent Office 3,229,231

Patented Jan. 11, 1966

3,229,231

SINGLE SIDE BAND HALL-TYPE MODULATOR AND DEMODULATOR

Wolja Saraga, Petts Wood, Orpington, Kent, England, assignor to Associated Electrical Industries Limited, London, England, a British company Filed Dec. 20, 1961, Ser. No. 160,746

Claims priority, application Great Britain, Dec. 29, 1960, 44,605/60

2 Claims. (Cl. 332—45)

This invention relates to modulation and demodulation circuit arrangements for frequency translation of A.C. signals, and in particular to such arrangements which employ the so-called phase-shift method of single sideband generation and reception.

In regard to modulation and demodulation circuit arrangements in general, an A.C. signal to be frequency translated is usually a relatively wide-band signal made up of, and able to be represented as the sum of, a plurality of different frequency components (e.g. audio frequency components of speech) each having its individual amplitude, frequency and phase angle. It is therefore strictly speaking not correct to refer to the amplitude, frequency or phase of the signal as a whole. However, in the arrangements with which the present invention is concerned the phase and amplitude relations of these individual frequency components are of importance so that in using strictly accurate terminology it would be necessary to refer every time to the phase and amplitude of each frequency component individually. Therefore, in order to simplify the description, the phase, frequency and amplitude of the A.C. signal will in certain circumstances be referred to as if the signal contained only a single frequency component. It will however be understood that the actual signal may contain any arbitrary numbers of such individual frequency components within a specified band. This simplification is justified since in a modulation or a demodulation process involving an A.C. signal and a carrier oscillation, each frequency component of the A.C. signal is, in effect, individually modulating the carrier oscillation or demodulated by it. Also, a carrier oscillation as considered hereinafter is referred to as being a single frequency oscillation. However, it is to be understood that in practice the carrier oscillation may well contain other frequency components, for instance harmonic components of the fundamental carrier frequency, and the term carrier oscillation is therefore to be construed accordingly.

Basically, the generation of a single sideband signal by the phase-shift method has hitherto involved two separate, simultaneous, modulation or demodulation processes with subsequent additive or subtractive combination of the modulation products in order to produce a resultant signal corresponding to their sum or difference as may be required. Combining circuits effecting such additive or subtractive combination are well known being, for instance, series or parallel arrangements according as the modulation products are to be combined on a current or voltage basis, or possibly hybrid transformers or summing amplifiers of the analogue computing type. For example, consider the phase-shift method of single sideband generation as employed in a presently known kind of phase-shift modulation arrangement such as may be used in carrier communication systems: in this modulation arrangement an A.C. signal to be frequency translated is applied in two different phases to respective matched modulators and modulates therein a carrier oscillation also applied to the two modulators in different respective phases. The modulation product of each modulator contains both upper and lower sideband signals having frequency components symmetrically spaced about the frequency of the carrier oscillation and, ideally, the upper and lower sideband signals produced by one modulator have components which have identical frequencies with those produced by the other modulator. However, the amplitudes of, and the phase difference between, the two phase-displaced A.C. signals on the one hand and the amplitudes of, and the phase difference between, the two phase-displaced carrier oscillations on the other hand are appropriately related to each other such that the corresponding sideband signals in the two modulation products are of such relative phase with respect to each other that additive or subtractive combination of the two modulation products in a combining circuit results in cancellation of one sideband signal, which is therefore suppressed, and reinforcement of the other. The factors determining this appropriate relationship between the amplitude and phase differences of the A.C. signals and of the carrier oscillations are well known. In practice it is usually desirable for the two A.C. signals, and likewise the two carrier oscillations, to be in phase quadrature, that is, to have a 90° phase difference but, subject to certain exceptions, departure from this in-quadrature phase relationship between the two A.C. signals can be compensated for by appropriately modifying the amplitude of, and the phase difference between, the two carrier oscillations, or vice versa. An example of this is given later in the specification.

A corresponding demodulation arrangement employing the phase-shift method is somewhat similar and also comprises two matched modulators to which a carrier oscillation is applied in different respective phases. Assuming for example that the demodulation arrangement is operating in conjunction with the modulation arrangement outlined above over a suitable transmission path interconnecting the two arrangements, then a carrier oscillation of the same frequency would be employed in each and a received A.C. signal to be frequency translated by the demodulation arrangement would contain frequency components occupying one sideband position (upper or lower), namely, frequency components corresponding to those in the upper or lower side-band output signal produced by the modulation arrangement. However, the received A.C. signal may also contain unwanted frequency components which occupy the alternate sideband position, for instance frequency components produced by another modulation arrangement also connected to the transmission path but operating with a carrier oscillation of higher or lower frequency, as the case may be, and therefore suppression of these unwanted frequency components has to be effected by the demodulation arrangement. To this end, the A.C. signal is applied in common to the two modulators and each modulator produces as a result a complex output signal containing high frequency components derived from both wanted and unwanted frequency components of the received A.C. signal together with low frequency components likewise derived from both the wanted and unwanted frequency components of the received A.C. signal. The high frequency components in the two modulator output signals can, if required, be suppressed by means of relatively simple filters, and the remaining low frequency components in the two modulator output signals are phase-shifted either before or after any such filtration so that their frequency components, which are substantially identical in frequency and magnitude, are of such relative phase with respect to each other that additive or subtractive combination of the two signals in a combining circuit will result in cancellation of the unwanted translated frequency components, leaving the wanted translated frequency components for subsequent utilisation.

It will be evident from the foregoing that with these known modulation and demodulation arrangements employing the phase-shift method the efficiency of the suppression of the unwanted sideband signal, or the unwanted "received" signal as the case may be, depends on the accuracy of the amplitude and phase relationships of the frequency components in the modulation products of the two modulators: therefore precision design and adjustment, and also long-term stability, are required for the two matched modulators, as well as for the two phase-shift networks.

It is an object of the present invention to effect frequency translation of an A.C. signal in such manner that, ideally, no unwanted sideband is produced and that as applied to modulation or demodulation arrangments employing the phase-shift method, the use of two matched modulators in these arrangements is avoided.

The invention makes use of the Hall effect exhibited by a suitable conducting element, that is the effect by which, when a conducting element is carrying current and is subjected to a magnetic field transverse to the direction of the current, a voltage is produced between points on the element lying along a line transverse both to the current and to the field, the magnitude of the voltage being substantially proportional to the product of the components of the field and current at right angles to each other and to said line. An element which exhibits the Hall effect will be hereinafter referred to as a "Hall effect element."

According to one aspect of the invention a Hall effect element is arranged to lie in a rotating magnetic field, produced by suitable means responsive to a first A.C. signal applied to said means in different phases, and to have applied to it in different phases a second A.C. signal effective for producing in the element, in the same plane as the rotating magnetic field, a rotating electric current vector, the arrangement being such that, in use, there is produced by the Hall effect element between points thereon lying along a line transverse to said plane an A.C. voltage signal which is substantially proportional to the vector product of the rotating magnetic field vector and the electric current vector, that is the product of those components of these vectors which are at right angles to each other, which A.C. voltage signal contains frequency components corresponding to upper or lower sideband frequencies of the modulation product of said first and second A.C. signals. If the magnetic field and electric current vector rotate in the same direction then the A.C. voltage signal will contain frequency components corresponding to the lower sideband, whereas if they rotate in opposite directions the frequency components will correspond to the upper sideband.

Thus if the above arrangement is employed in the previously considered modulation arrangment in such manner that the carrier oscillation of the modulation arrangement constitutes either the first or the second A.C. signal referred to, while an A.C. signal to be frequency translated constitutes the alternate signal, it is evident that single sideband generation will be achieved as before, but with the advantages that under ideal conditions the unwanted sideband is not produced and that neither the two matched modulators nor the combining circuit are now required.

According to another aspect of the invention a Hall effect element is arranged to lie, as before, in a rotating magnetic field produced by suitable means responsive to a first A.C. signal applied to said means in different phases, but in this instance the element is arranged to reecive a second A.C. signal between points on it which lie along a line transverse to the plane of the magnetic field and the arrangement is now such that, in use, there is produced by the Hall effect element in different phases and between respective further pairs of points thereon which lie along lines in the same plane as the rotating magnetic field, A.C. voltage signals which are substantially proportional to the components, in selected directions, of the vector products of the rotating magnetic field vector and of a current vector pertaining to said second A.C. signal, this latter vector being fixed in space.

If, in this latter arrangment either the first or the second A.C. signal is constituted by a carrier oscillation while the alternate signal is constituted by a complex A.C. signal which contains upper or lower sideband frequencies obtained by modulation of a like carrier oscillation with a third A.C. signal, then the A.C. voltage signals obtained will contain the frequency components of said third A.C. signal. Consequently, this latter arrangement can be employed in the previously considered demodulation arrangement in place of the two matched modulators in order to achieve single sideband reception: the A.C. voltage signals are in this instance obtained in two different arbitrary phases from the Hall effect element and correspond to the complex output signals obtained from the two modulators in the known demodulation arrangement.

It will be seen from these two aspects of the invention that if the two matched modulators used in the presently known modulation (or demodulation) arrangment employing the phase-shift method as hereinbefore considered are replaced by a single Hall effect element affording frequency translation in conformity with the invention then, in each case, the separate requirements concerning the two matched modulators are resolved into requirements relating only to the Hall effect element.

In order that the invention may be more fully understood reference will now be made to the accompanying drawings in which:

FIGS. 5 and 6 illustrate diagrmmatically respective forms of Hall effect devices suitable for the invention.

Figure 1:
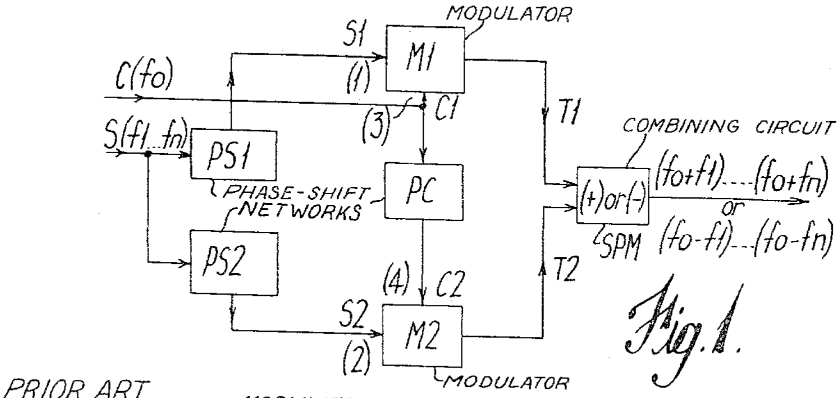
Fig. 1. PRIOR ART
FIG. 1 is a block diagram of a presently known modulation arrangment employing the phase-shift method.

Referring to FIG. 1, the modulation arrangement there shown comprises three phase-shift networks PS1, PS2 and PC, two modulators M1 and M2, and a combining circuit SPM. An A.C. signals S containing frequency components $f_1 \ldots f_n$ is simultaneously applied to the two phase-shift networks PS1 and PS2 which in response thereto respectively produce corresponding phase-shifted output signals S1 and S2. Assuming that the networks PS1 and PS2 are so designed that all the frequency components of the signals S1 and S2 are approximately in quadrature, then if the signal S is represented in usual manner by:

$$S=\sum_{k=1}^{k=n} a_k \cos\,(\omega_k t+\beta_k)$$

$$S1=\sum_{k=1}^{k=n} a_k \cos\,(\omega_k t+\beta_k+\gamma_k)$$

and $$S2=\sum_{k=1}^{k=n} a_k \cos\left(\omega_k t+\beta_k+\gamma_k-\frac{\pi}{2}\right)$$

$$=\sum_{k=1}^{k=n} a_k \sin\,(\omega_k t+\beta_k+\gamma_k)$$

where $\gamma_k$ and $(\gamma_k-\pi/2)$ are the phase changes imposed on the signal S by the networks PS1 and PS2 respectively.

The signal S1 is applied to the modulator M1 together with a carrier oscillation C of single frequency $f_0$, and the signal S2 is applied to the other modulator M2 together with a carrier oscillation C2 as produced by the phase-shift network PC, where $$C=C1=C_0 \sin \omega_0 t \text{ and } C2=C_0 \cos \omega_0 t$$

that is, the carrier oscillation C2 has the same frequency and amplitude as the carrier oscillation C1, but is in quadrature with it.

If it is assumed that the modulators M1 and M2 are simple multipliers then the output from each will be proportional to the product of the applied signal (S1 or S2) and the carrier oscillation (C1 or C2). (In practice further "higher-order" products are generated.)

Thus, neglecting proportionality constants, the output signal (T1) from the modulator M1 will be:

$$T1=S1C1=C_o\sum_{k=1}^{k=n}\tfrac{1}{2}a_k\{\sin[(\omega_o+\omega_k)t+\beta_k+\gamma_k]+\sin[(\omega_o-\omega_k)t-\beta_k-\gamma_k]\}$$

and the output signal (T2) from the modulator M2 will be:

$$T2=S2C2=C_o\sum_{k=1}^{k=n}\tfrac{1}{2}a_k\{\sin[(\omega_o+\omega_k)t+\beta_k+\gamma_k]-\sin[(\omega_o-\omega_k)t-\beta_k-\gamma_k]\}$$

It will be seen from these two equations that both output signals T1 and T2 contain both side-bands. However, the upper side-bands occur in T1 and T2 in phase, whereas the lower side-bands occur in phase opposition. Therefore the sum of the output signals T1 and T2 contains only the upper side-band having frequency components $(f_0+f_1)$ . . . $(f_0+f_n)$ and the difference contains only the lower side-band having frequency components $(f_0-f_1)$ . . . $(f_0-f_n)$, so that a single side-band resultant output signal can be obtained by additively or subtractively combining the output signals T1 and T2 in the combining circuit SPM.

If the signal S1 is applied to modulator M2 instead of to modulator M1, while the signal S2 is applied to modulator M1 instead of to modulator M2, then the output (T1) from the modulator M1 will become:

$$T1=S2C1=C_o\sum_{k=1}^{k=n}\tfrac{1}{2}a_k\{-\cos[(\omega_o+\omega_k)t+\beta_k+\gamma_k]+\cos[(\omega_o-\omega_k)t-\beta_k-\gamma_k]\}$$

and the output (T2) from the modulator M2 will become:

$$T2=S1C2=C_o\sum_{k=1}^{k=n}\tfrac{1}{2}a_k\{\cos[(\omega_o+\omega_k)t+\beta_k+\gamma_k]+\cos[(\omega_o-\omega_k)t-\beta_k-\gamma_k]\}$$

Thus, as before, the output signals T1 and T2 contain both side-bands but in this instance their sum contains only the lower side-band and their difference contains only the upper side-band.

Figures 2, 3:
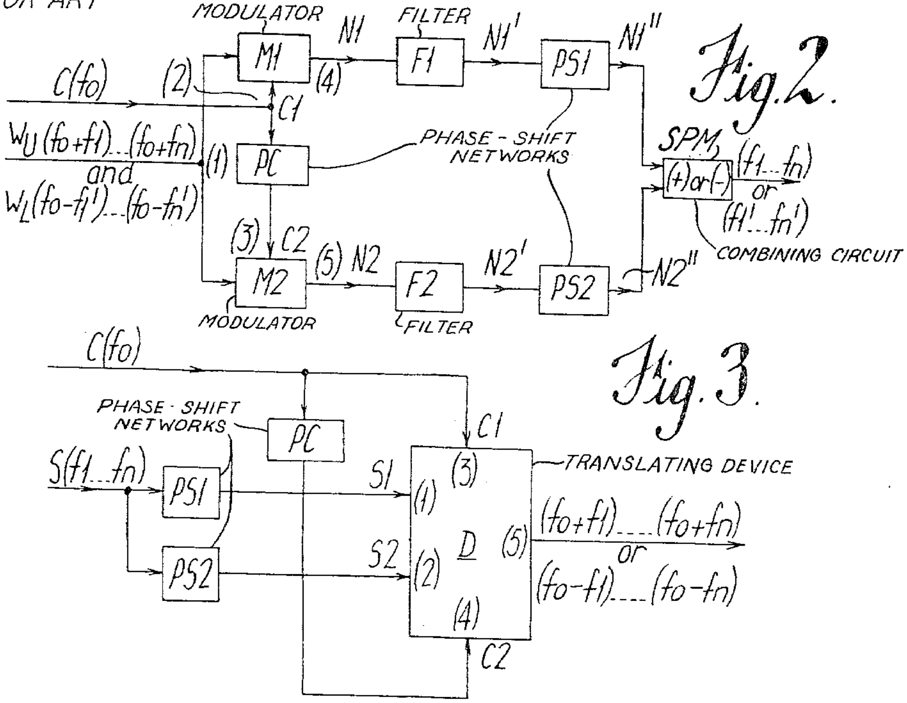
FIG. 2 is a block diagram of a presently known demodulation arrangment employing the phase-shift method.
FIG. 3 is a block diagram of a modulation arrangement embodying the invention.

The demodulation arrangement shown in FIG. 2 similarly comprises two modulators M1 and M2, three phase-shift networks PS1, PS2 and PC, a combining circuit SPM and, additionally, two filters F1 and F2. In this instance it is assumed that an input signal which consists of two independent signals $W_U$ and $W_L$ is present at the input of the arrangement, these signals $W_U$ and $W_L$ containing frequency components $(f_0+f_1)$ . . . $(f_0+f_n)$ and $(f_0-f'_1)$ . . . $(f_0-f'_n)$ respectively and being represented as follows:

$$W_U=\sum_{k=1}^{k=n}a_k\cos[(\omega_o+\omega_k)t+\alpha_k]$$

and $$W_L=\sum_{k=1}^{k=n}a_k\cos[(\omega_o-\omega'_k)t+\alpha_k]$$

where $\omega_k=2\pi(f_1\ldots f_n)$ and $\omega'_k=2\pi(f'_1\ldots f'_n)$. It is to be understood that the frequency components $f_1$ . . . $f_n$ and the frequency components $f'_1$ . . . $f'_n$ are quite unrelated although they occupy the same frequency band; thus the term $\omega_k$ in the equation for $W_U$ is in no way related to the term $\omega'_k$ in the equation for $W_L$.

Although the modulators M1 and M2 are necessarily non-linear elements, it is well known that such modulators can be treated as quasi-linear devices, in the sense that the independent signals $W_U$ and $W_L$ constituting the input signal may be considered separately and that the output signal produced by the demodulation arrangement is the sum of output signals produced by the signals $W_U$ and $W_L$ taken separately.

Consider the signal $W_U$ first, this signal is applied simultaneously to the two modulators M1 and M2 to which are also applied respective carrier oscillations C1 and C2. As in the modulation arrangement of FIG. 1, $C1=C_0\sin\omega_0t$ and $C2=C_0\cos\omega_0t$ so that, assuming again that the modulators M1 and M2 act as pure multipliers their respective output signals N1 and N2 are:

$$N1=W_UC1=C_o\sum_{k=1}^{k=n}a_k\cos[(\omega_o+\omega_k)t+\alpha_k]\sin\omega_ot$$
$$=\tfrac{1}{2}C_o\sum_{k=1}^{k=n}a_k\{\sin[(2\omega_o+\omega_k)t+\alpha_k]-\sin(\omega_kt+\alpha_k)\}$$

and $$N2=W_UC2=C_o\sum_{k=1}^{k=n}a_k\cos[(\omega_o+\omega_k)t+\alpha_k]\cos\omega_ot$$
$$=\tfrac{1}{2}C_o\sum_{k=1}^{k=n}a_k\{\cos[(2\omega_o+\omega_k)t+\alpha_k]+\cos(\omega_kt+\alpha_k)\}$$

The terms in the signals N1 and N2 with $(2\omega_o+\omega_k)$ represent high-frequency components which are suppressed in the filters F1 and F2 so that, disregarding a further phase and amplitude variation which is the same for N1 and N2, filter F1 produces an output signal:

$$N1'=-\tfrac{1}{2}C_o\sum_{k=1}^{k=n}a_k\sin(\omega_kt+\alpha_k)$$

and the filter F2 produces an output signal:

$$N2'=\tfrac{1}{2}C_o\sum_{k=1}^{k=n}a_k\cos(\omega_kt+\alpha_k)$$

The signal N1′ is applied to the phase-shift network PS1 which produces a phase-shift $\gamma_k$. The signal N2′ is applied to the phase-shift network PS2 which produces a phase-shift $\gamma_k-\tfrac{1}{2}\pi$. Thus the networks PS1 and PS2 produce respective signals N1″ and N2″ as follows:

$$N1''=-\tfrac{1}{2}C_o\sum_{k=1}^{k=n}a_k\sin(\omega_kt+\alpha_k+\gamma_k)$$
$$N2''=\tfrac{1}{2}C_o\sum_{k=1}^{k=n}a_k\cos(\omega_kt+\alpha_k+\gamma_k-\tfrac{1}{2}\pi)$$
$$=\tfrac{1}{2}C_o\sum_{k=1}^{k=n}a_k\sin(\omega_kt+\alpha_k+\gamma_k)$$

and thus N1″=−N2″.

Consider now the signal $W_L$. Formally the only difference between $W_U$ and $W_L$ is that $(\omega_o+\omega_k)$ in $W_U$ becomes $(\omega_o-\omega'_k)$ in $W_L$. Thus the above equations for N1 and N2 remain generally the same for $W_L$ if $\omega_k$ is replaced by $-\omega'_k$, and the equations for the signals N1′ and N2′ can be written in the form $$N1'=+\tfrac{1}{2}C_o\sum_{k=1}^{k=n}a_k\sin(\omega'_kt-\alpha_k)$$

and $$N2'=\tfrac{1}{2}C_o\sum_{k=1}^{k=n}a_k\cos(\omega'_kt-\alpha_k)$$

Therefore the signals N1″ and N2″ at the outputs of the networks PS1 and PS2 with respective phase-shifts $\gamma_k$ and $\gamma_k - \frac{1}{2}\pi$ become:

$$N1'' = +\frac{1}{2}C_o \sum_{k=1}^{k=n} a_k \sin(\omega'_k t - \alpha_k + \gamma_k)$$

$$N2'' = \frac{1}{2}C_o \sum_{k=1}^{k=1} a_k \cos(\omega'_k t - \alpha_k + \gamma_k - \frac{1}{2}\pi)$$

$$= \frac{1}{2}C_o \sum_{k=1}^{n} a_k \sin(\omega'_k t - \alpha_k + \gamma_k)$$

Thus, for $W_L$:

$$N1'' = +N2''$$

The former equations for the signals N1″ and N2″ show that the difference of those signals contains only components due to $W_U$ while the latter equations show that their sum contains only components due to $W_L$. Consequently, from the input signal $W_U + W_L$ either the frequency components $f_1 \ldots f_n$ originating in $W_U$ or the frequency components $f'_1 \ldots f_n$ originating in $W_L$ may be obtained by subtractive or additive combination of the signals N1″ and N2″ in the combining circuit SPM.

Turning now to the application of the invention, the modulation arrangement shown in FIG. 3 corresponds to that of FIG. 1 except that, in conformity with the invention, the two modulators M1 and M2 and the combining circuit SPM are replaced by a single modulating device D. This device D has four inputs coresponding to the four inputs to which the signals S1 and S2 and the carrier oscillations C1 and C2 are applied in FIG. 1, and a single output corresponding to the output from which the single sideband is produced from the combining circuit SPM. Similarly, the demodulation arrangement shown in FIG. 4 corresponds to that of FIG. 2, except that in this instance only the two modulators M1 and M2 are replaced by a single modulating device D which has three inputs corresponding to the modulator inputs and two outputs corresponding to their outputs. It is to be appreciated that the filters F1 and F2 in FIGS. 2 and 4 could be located at the other side of the phase-shift networks PS1 and PS2, or possibly, they may not be required at all in arrangements where the high frequency components are ineffective.

Figure 4:
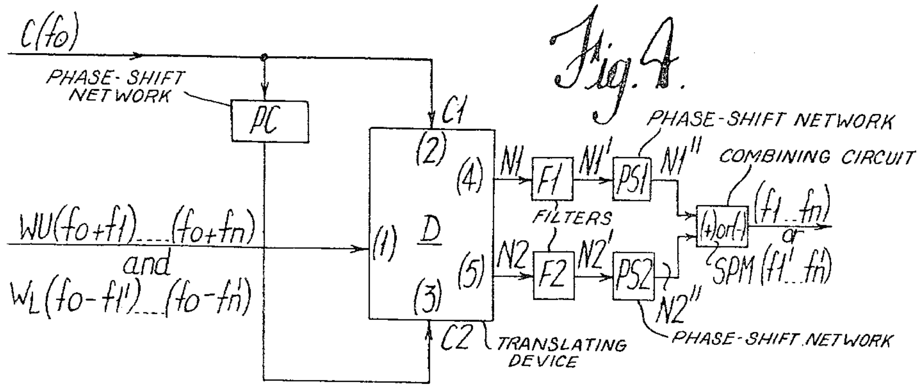
FIG. 4 is a block diagram of a demodulation arrangement embodying the invention.

The modulating device D employed in FIGS. 3 and 4 may take the form shown in FIG. 5. In this figure a Hall effect element which is a square prism 1 of semi-conductor material is positioned so that its square cross-section lies in a plane $x$–$y$. The prism 1 is subjected in the $x$ direction to a magnetic field produced by coils $Cx$ and in the $y$ direction to a magnetic field produced by coils $Cy$. Thus, if the field producing current in the coils $Cx$ is the carrier oscillation C1, equal to $C_o \sin \omega_o t$, and the field producing current in the coils $Cy$ is the carrier oscillation C2, equal to $C_o \cos \omega_o t$, then there is produced in the $x$–$y$ plane a rotating magnetic field vector of magnitude $c_o$ at an angle $\frac{1}{2}\pi - \omega_o t$ with the $x$-direction.

As shown at (a) in FIG. 5, in the case where the modulating device is employed in the modulation arrangement, the signals S1 and S2 are applied through the prism 1 in the $x$–$y$ plane in directions perpendicular to each other, suitably across the diagonals $d1$ and $d2$, respectively, of the square cross-section. Since $d1$ and $d2$ are perpendicular to each other, and as all frequency components of the signals S1 and S2 have a phase difference of 90° for each frequency component a rotating electric current vector is produced, of magnitude $a_k$ and of angle $\omega_k t + \beta_k + \gamma_k$ with the direction of the diagonal $d1$. Due to the Hall effect of the prism 1 an output voltage is produced in a direction perpendicular to both the input signals S1 and S2 and the magnetic field. The output voltage vector is in the $z$ direction and its magnitude is proportional to the magnitudes of the current and magnetic field vectors (that is, to $c_o$ and $a_k$), and also to the sine of the angle between these two vectors, which angle, apart from arbitrary and constant phase terms, is $$\sin(\omega_o \pm \omega_k)t$$

The positive sign of the equation applies if the current and magnetic field vectors rotate in opposite directions and the negative sign applies if they rotate in the same direction. This output voltage therefore corresponds to the single sideband output produced by the modulation arrangement of FIG. 1. The direction of rotation of the magnetic vector can be reversed by replacing the carrier oscillation C1 by −C1 or the carrier oscillation C2 by −C2. Likewise the rotation of the current vector can be reversed by replacing the signal S1 by −S1 or the signal S2 by −S2.

In the case where the modulating device D is employed in the demodulation arrangement the input signal $$W_U + W_L$$

is applied as input current in the $z$ direction as shown at ($b$) in FIG. 5. Consider one single frequency component of $W_U + W_L$, namely $a_k \cos(\omega \pm \omega_k)t$ (assuming for the sake of convenience that $\omega'_k t$ can be represented by $\omega_k t$ for $W_L$ and that $\alpha = 0$), together with the two carrier oscillations C1 and C2 which, as in the previous case are producing a rotating magnetic vector, of magnitude $c_o$ and of angular position $\frac{1}{2}\pi - \omega_o t$ (with reference to the $x$ direction) in the $x$–$y$ plane. In this instance the Hall voltage vector, which must be perpendicular to the magnetic vector and the input current vector, must also lie in the $x$–$y$ plane and must rotate with the same angular velocity as the magnetic field vector, at a right angle to it.

At this stage of the explanation it is convenient to introduce an $x$–$y$ plane rotating with the magnetic vector, as a new reference plane. With respect to this new reference plane, both the magnetic vector and the Hall voltage vector are fixed in position. However, whereas the magnetic vector has a fixed magnitude $c_o$, the Hall voltage vector is proportional not only to $c_o$ but also to the input current $a_k \cos(\omega_o \pm \omega_k)t$: this pulsating but nonrotating Hall voltage vector can be represented as the sum of two vectors, say H1 and H2, rotating in opposite directions with angular velocity $(\omega_o \pm \omega_k)$. Turning now from the rotating reference plane to the original fixed reference plane $x$–$y$, it will be seen that with reference to this original plane one of the vectors H1 and H2 rotates with angular velocity $(\omega_o \pm \omega_k) + \omega_o = 2\omega_o \pm \omega_k$ and the other with angular velocity $(\omega_o \pm \omega_k) - \omega_o = \pm \omega_k$. One of these vectors will therefore produce a high frequency signal and the other vector, rotating with angular velocity $\pm \omega_k$, will produce a frequency signal corresponding to the modulation product of the carrier oscillation C and either the signal $W_U$ or $W_L$. The two signs indicate that the Hall voltage vectors due to $W_U$ rotate in the opposite direction to Hall voltage vectors due to $W_L$.

As a consequence, Hall voltage signals N1 and N2, which correspond to the signals N1 and N2 in the arrangement of FIG. 2, are produced by the demodulating device D. These signals N1 and N2 may be obtained from the rotating voltage vectors at electrodes on the semiconductor prism 1 which are located in the $x$–$y$ plane, suitably at opposite ends of the two diagonals $d1$ and $d2$ of the square cross-section of the prism, in which case all their frequency components are in quadrature, that is, they have a phase difference of ±90° where one of the signals applies to components of signal $W_U$ and the other sign to components of signal $W_L$, as required by the equations for these signals N1 and N2. In the same manner as for the arrangement of FIG. 2, the high frequency components in N1 and N2 are suppressed by the filters F1 and F2, leaving signals N1′ and N2′ which are applied to the phase-shift networks PS1 and PS2 for phase shifting in order to produce signals N1″ and N2″, where $N1''=-N2''$ in the case of frequency components due to $W_U$ and $N1''=N2''$ in the case of frequency components due to $W_L$. Subtractive or additive combination of the signals N1″ and N2″ in the combining circuit SPM will therefore result in either the frequency components ($f_1 \ldots f_n$) in $W_U$ or the frequency components ($f'_1 \ldots f'_n$) in $W_L$ being obtained as previously.

It should be understood that only the basic principle of the invention has been described. The means for producing the required rotating magnetic field and required rotating current vectors in the semiconductor prism and the electrode arrangements for feeding the input currents into the semiconductor prism and for obtaining the required output voltages will be carried out in accordance with conventional practice so as to achieve operation under optimum conditions.

In FIG. 5 the semiconductor prism has been shown to have a square cross-section. In practice prisms of other cross-sections, a circular cross-section in particular, may be used as long as they possess the necessary symmetry to permit the generation of the required rotating fields.

In the foregoing description concerning both the modulation and the demodulation arrangement embodying the invention, the electric and magnetic rotating fields are described as being generated in the well-known conventional way by applying two fields, say $Fx$ and $Fy$, in the direction of the $x$ axis and the $y$ axis, respectively, where $Fx=\cos wt$ and $Fy=\sin wt$. The resulting field F has a magnitude $F=\sqrt{Fx^2+Fy^2}=1$, and for the angle $\phi$ formed by the field with the $x$ axis $$\tan \phi=Fy/Fx=\tan \omega t$$

so that $\phi=\omega t$. In this instance, therefore, a rotating field of magnitude 1 and angular direction $wt$ (that is, rotating with constant angular velocity) has been produced.

However, it is well known that such rotating fields can also be produced by applying the generating fields in two directions which are not perpendicular to each other. In this case the deviation from the angle $\pi/2$ assumed above is compensated for by changing the amplitudes and phases of the two generating fields: this will now be demonstrated.

Assume that one field, F1, is applied as before in the direction of the $x$ axis and that another field, F2, is applied in a direction forming an angle $\phi_o$ with the $x$ axis, where $$\phi_o \neq \pm\frac{n\pi}{2}$$

(where $n$ is any integer including 0). Let $$F1=-\frac{1}{\sin \phi_o}\cdot\sin (\omega t-\phi_o)$$

and $$F2=+\frac{1}{\sin \phi_o}\cdot\sin \omega t$$

Then the total field in the direction of the $x$ axis is $$Fx'=-\frac{1}{\sin \phi_o}\sin (\omega t-\phi_o)+\cos \phi_o\cdot\frac{1}{\sin \phi_o}\cdot\sin \omega t$$
$$=-\frac{1}{\sin \phi_o}[\cos \phi_o \sin \omega t-\sin \phi_o \cos \omega t]+\frac{\cos \phi_o}{\sin \phi_o}\cdot\sin \omega t$$
$$=+\cos \omega t$$

and the total field in the direction of the $y$ axis is $$Fy'=+\sin \phi_o\cdot\frac{1}{\sin \phi_o}\cdot\sin \omega t$$
$$=+\sin \omega t$$

Therefore $Fx'=Fx$, and $Fy'=Fy$, so that the application of F1 and F2 in two directions not perpendicular to each other is equivalent to the application of $Fx$ and $Fy$ in the direction of the $x$ axis and the $y$ axis, respectively.

It will therefore be evident that this alternative way of producing the electric and magnetic rotating fields provides an additional degree of freedom in the design of a Hall effect element (semiconductor prism) intended for use as the modulating or the demodulating device D. For example, it is envisaged, as already stated, that instead of the semiconductor prism having a square cross-section, it may with advantage have a circular cross-section which would afford the symmetry necessary to permit the generation of the required rotating fields by applied fields which are not perpendicular to each other.

Figure 6:
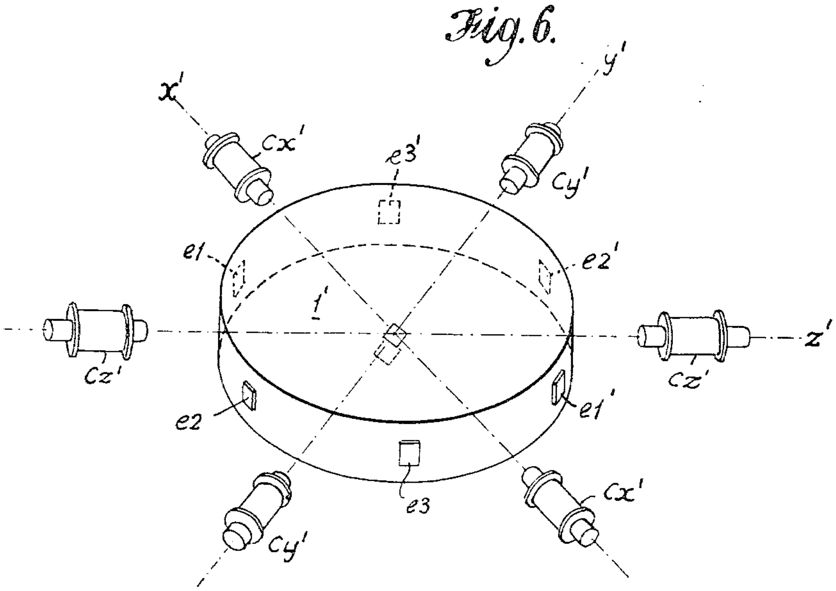

Furthermore, either the electric or the magnetic rotating field, or both these fields, may be generated by means of more than two appropriately phase-displaced fields. For example, in FIG. 6 there is shown a Hall effect element, constituted by a prism 1′ of circular cross-section, which is subjected in the $x'$ direction to a magnetic field produced by coils Cx′, in the $y'$ direction to a magnetic field produced by coils Cy′ and in the $z'$ direction to a magnetic field produced by coils Cz′. Thus, if the field producing currents in these three coils, situated 120° apart, are respective phases of the carrier oscillation (C), equal to $C_0 \cos (\omega_0 t+240°)$, $C_0 \cos \omega_0 t$ and $C_0 \cos (\omega_0 t+120°)$ then, as in the two-phase arrangement of FIG. 5, there is produced in the prism 1′ a rotating magnetic field vector of magnitude $C_o$. The rotating electric field may be likewise produced by more than two phases of the input signal (S), for instance by three phases thereof having 120° phase differences applied respectively to pairs of electrodes e1, e1′, e2, e2′ and e3, e3′ spaced 120° apart about the periphery of the prism 1′. Three or more phases of the carrier oscillation and/or the modulating signal may, of course, be employed where the Hall effect prism is of square or other cross-section instead of circular cross-section. Conversely, two phases of the carrier oscillation and/or the modulating signal may be employed where the Hall effect prism is of circular cross-section. Phase shifting networks for producing the three or more phases of a signal which may be required may be of any known form, for example of the form considered in the article "The Design of Wideband Phase Splitting Networks" previously referred to. It is to be understood that the number of phases of a signal used to produce the rotating magnetic field need not be the same as the number of phases of another signal used to produce, when required, the rotating electric field.

For both the known modulation and demodulation arrangements and the modulation and demodulation arrangements embodying the invention, it has been stated that the carrier oscillation C2 is produced in quadrature with the carrier oscillation C by the single phase-shift network PC, as compared with the two-phase shift networks PS1 and PS2 which on the one hand produce the in-quadrature signals S1 and S2 by phase-splitting the wide-band A.C. signal S and on the other hand produce the phase corrected signals N1″ and N2″ from the applied in-quadrature signals N1′ and N2′. This would more usually be the case since, as is well known, only a relatively simple phase-shift network is needed to produce a 90° phase difference for a single frequency, but it is to be appreciated that two phase-shift networks could be used to produce the in-quadrature carrier oscillations C1 and C2: conversely, a single phase-shift network such for instance as is described in United States Patent No. 2,726,368 or in "A Quadrature Network for Generating Vestigial-Sideboard Signals," Proc. I.E.E., vol. 107, May 1960, Part B at pp. 253–260, could be used for producing the wideband in-quadrature signals S1 and S2 or the phase corrected signals N1″ and N2″, as the case may be. Where two phase-shift networks such as PS1 and PS2 are provided they may for example take the form described in "The Design of Wideband Phase Splitting Networks,' Proc. I.R.E., July 1950, pp. 754–770 (W. Saraga), in "Realization of a Constant Phase Difference" (S. Darlington), Bell System Technical Journal 29, 1950, in "Synthesis of Wide-Band Two-Phase Networks" (H. J. Orchard), Wireless Engineer 27, 1950, or in "Constant Phase Shift Networks" (R. O. Rowlands), Wireless Engineer 26, 1949.

Furthermore, although in the foregoing description in-quadrature signals (S1 and S2, or N1' and N2') and in-quadrature carrier oscillations (C1 and C2) have been assumed, it is well known that in phase-shift modulation and demodulation arrangements a deviation from the phase difference of 90° between the two carrier oscillations can be compensated for by a corresponding deviation from the phase difference of 90° between the two signals; and vice versa. Such deviation is equally applicabel in the case of the present invention as will now be demonstrated, by way of example, in respect of the modulation arrangement.

Consider once again the equations for T1 and T2 in the instance where $T1=S1C1$ and $T2=S2C2$. From the earlier description it is evident that in this instance the lower side-band may be represented as $(S1C1-S2C2)$ and the upper side-band as $(S1C1+S2C2)$, one or the other of which side-bands is required. In the ideal case in which the signals S1, S2 and the carrier oscillations C1 and C2 are in-quadrature:

$$S1=\cos \omega_k t \qquad C1=\sin \omega_0 t$$
$$S2=\sin \omega_k t \qquad C2=\cos \omega_0 t$$

if, for the sake of simplicity, the signal S is assumed to be a single frequency signal and its amplitude, and the amplitude of the carrier oscillation C, are assumed to be unity and the phase angles $\beta_k$ and $\gamma_k$ ignored (or assumed to be 0). Therefore, $$S1C1+S2C2=\sin (\omega_0+\omega_k)t \text{ and}$$
$$S1C1-S2C2=\sin (\omega_0-\omega_k)t$$

Now, if only carrier oscillations of the form $$C1'=a_1 \sin \omega_0 t$$

and $C2'=a_2 \cos (\omega_0 t+8)$ are available, where $$\delta \neq \pm \frac{n\pi}{2}$$

(where $n$ is any integer including 0), the above side-band signals are still obtainable by arranging that $$a_1=a_2=\frac{1}{\cos \delta}$$

and S1 and S2 are replaced by $$S1'=\cos (\omega_k t \mp \delta)$$
$$\text{and } S2'=\sin \omega_k t$$

where the negative sign (—) in the equation for S1' applies if the upper sideband is required and the positive sign (+) applies if the lower sideband is required.

In this instance:

$$S1'C1' \pm C2'C2'$$

$$=\frac{1}{\cos \delta} \sin \omega_o t \cos (\omega_k t \mp \delta) \pm \cos (\omega_o t+\delta) \sin \omega_k t$$

$$=\frac{1}{\cos \delta} \sin \omega_o t (\cos \omega_k t \cos \delta \pm \sin \omega_k t \sin \delta) \pm$$
$$\cos \omega_o t \cos \delta \sin \omega_k t \mp \sin \omega_o t \sin \delta \sin \omega_k t$$

Thus $$S1'C1' \pm S2'C2'=\sin \omega_0 t \cos \omega_k t \pm \cos \omega_0 t \sin \omega_k t$$
$$=\sin (\omega_0 t \pm \omega_k)t$$

as required.

The above explanation also applies with appropriate substitution of terms to the demodulation arrangement embodying the invention, and of course to known modulation and demodulation arrangements employing the phase-shift method of single sideband generation.

Although generation and reception of only a single sideband has been considered in the foregoing description, it is possible to employ the phase-shift method for simultaneous generation and reception of a two-channel signal comprising upper and lower sidebands which convey different intelligence. Such two-channel operation is very attractive in practice because it affords generation (or reception) of two independent sidebands by a single phase-shifting and modulating (or demodulating) arrangement. The manner in which it is achieved in respect of the known modulation and demodulation arrangements employing the phase-shift method shown in FIG. 1 is described in detail in "The Phase-Shift Method of Single Side-Band Signal Generation," Proc. I.R.E., vol. 44, No. 12, December 1956, p. 1718, and in "The Phase-Shift Method of Single Side-Band Signal Reception, ibid p. 1735, respectively.

Two-channel operation may be correspondingly achieved by phase-shift modulation and demodulation arrangements embodying the present invention. More specifically, in the case of single sideband generation the upper sideband *or* the lower sideband is obtained (as already described) depending on the polarity of the signals and carrier oscillations S1, S2, C1 and C2. For instance, changing the direction of the magnetic vector by replacing the signal S1 by —S1 or the signal S2 by —S2 would result in an interchange of the upper and lower sidebands. Therefore, if in addition to the signals S1 and S2, a second independent signal S' is also applied to the modulating device D as signals +S'1 and —S'2, or —S'1 and +S'2, it is evident that there will be obtained at the output of the modulating device D one type of sideband (upper or lower) for the signal S and the opposite sideband for the signal S'. Conveniently, these signals +S'1 and —S'2, or —S'1 and +S'2 may be produced by applying the signal S' directly to one of the phase-shift networks PS1 or PS2 and in antiphase (i.e. with 180° phase difference) to the other, whereas the original signal S is applied in the same phase to both networks. This utilises the networks PS1 and PS2 for both signals but, as an alternative, separate phase-shift networks could be provided for the signal S' if desired.

Two-channel operation in respect of the demodulation arrangement embodying the invention may also be achieved and, like its application to known demodulation arrangements as described in the article referred to above, involves the use of a combining circuit which gives both additive *and* subtractive combinations of the received signals. Thus if in the arrangement of FIG. 4 the combining circuit SPM is replaced by such a circuit there will be produced an upper sideband signal ($f_1 \ldots f_n$) arising from N1"=—N2" in respect of frequency components due to $W_U$ and a lower sideband signal ($f'_1 \ldots f'_n$) arising from N1"=N2" in respect of frequency components due to $W_L$.

What I claim is:

1. A frequency translating circuit arrangement comprising a Hall effect element, a plural-phase electromagnetic structure, means for producing differently phased versions of a first alternating current signal, said structure being responsive to said differently phased versions to produce a rotating magnetic field in said Hall effect element, a plurality of input electrode pairs of said element lying along respective mutually crossing lines in the plane of rotation of said magnetic field, means for producing differently phased versions of a second alternating current signal which is to be modulated with said first alternating current signal, said input electrode pairs being connected for receiving respective ones of the differently phased versions of said second alternating current signal to produce in said element a rotating electric current vector having the same plane of rotation as said magnetic field, and a pair of output electrodes on said element lying along a line transverse to said plane, whereby with said first and second alternating current signals present there will be obtained from the Hall effect element at said output electrodes an alternating output voltage signal substantially proportional to the vector product of the rotating magnetic field vector and the rotating electric current vector and containing frequency components corresponding to upper or lower sideband frequencies of the modulation product of said first and second alternating current signals.

2. A frequency translating circuit arrangement comprising a Hall effect element, a plural-phase electromagnetic structure, means for producing differently phased versions of a first alternating current signal, said structure being responsive to said differently phased versions to produce a rotating magnetic field in said Hall effect element, a pair of input electrodes on said element lying along a line transverse to the plane of rotation of the magnetic field, means for applying to said pair of input electrodes a second alternating current signal to be demodulated by said first signal, two pairs of output electrodes on said element lying along mutually crossing lines in said plane, whereby with said first and second alternating current signals present there will be obtained from the Hall effect element at said two pairs of output electrodes respective alternating output voltage signals which are in different phases and are substantially proportional to components in selected directions of the vector products of the rotating magnetic field vector and an electric current vector, fixed in space, resulting from said second alternating current signal, and means for combining the two output voltage signals in antiphase relationship to produce a resultant demodulated signal.

References Cited by the Examiner

UNITED STATES PATENTS

| | | | |
|---|---|---|---|
| 2,649,574 | 8/1953 | Mason | 332—51 |
| 2,752,570 | 6/1956 | Hall | 332—45 |
| 2,872,647 | 2/1959 | Smith | 332—45 |
| 2,967,237 | 1/1961 | Schaefer et al. | 329—50 |
| 3,009,111 | 11/1961 | Rhodes | 329—50 |
| 3,050,698 | 8/1962 | Brass | 332—51 |

ROY LAKE, *Primary Examiner.*